May 12, 1970     K. NIELSEN, JR., ET AL     3,511,736
REINFORCED POLYURETHANE WREATH FORM
Filed May 10, 1967     2 Sheets-Sheet 1
FIG. 2
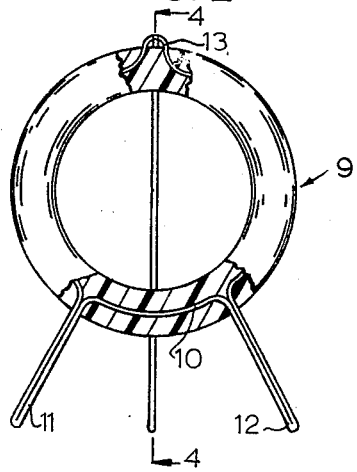
FIG. 3
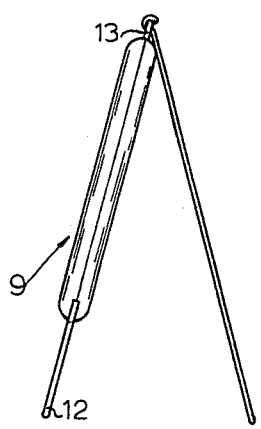
FIG. 4
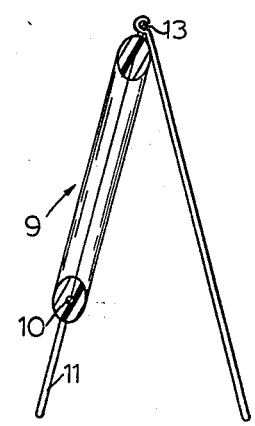
FIG. 5
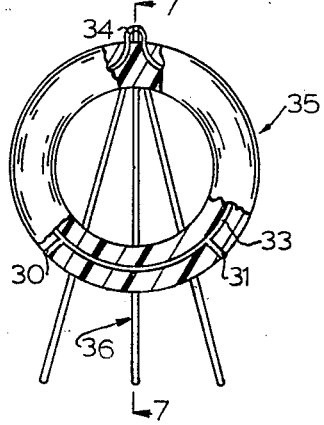
FIG. 6
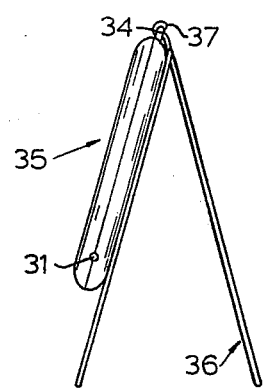
FIG. 7
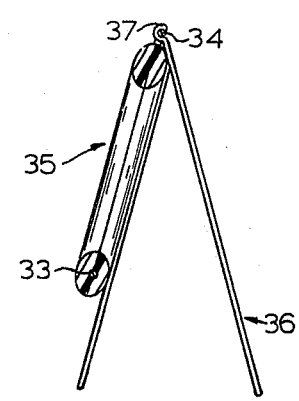
FIG. 8
- Place Ring In Mold
- Preheat Mold To 110°
- Inject Chemicals Into Mold
- Maintain Temperature At 110° For Ten Minutes
- Extract Wreath Form From Mold
- Wreath Form Cured At 83° For Twenty-Four Hrs.
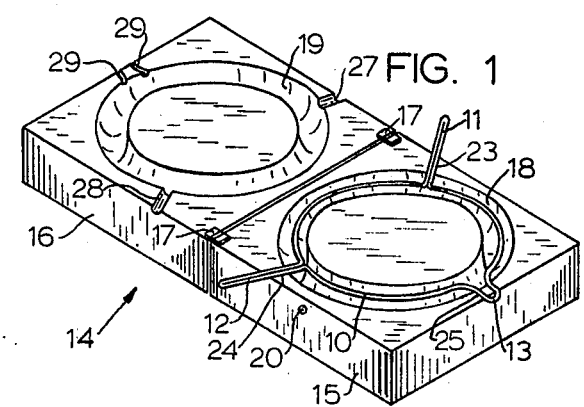
FIG. 1
INVENTORS
Knud Nielsen, Jr.
John M. Nielsen
BY
ATTORNEYS May 12, 1970 K. NIELSEN, JR., ET AL 3,511,736
REINFORCED POLYURETHANE WREATH FORM
Filed May 10, 1967 2 Sheets-Sheet 2

INVENTORS
Knud Nielsen, Jr.
John M. Nielsen
BY
ATTORNEYS

United States Patent Office 3,511,736
Patented May 12, 1970

3,511,736
REINFORCED POLYURETHANE WREATH FORM
Knud Nielsen, Jr., and John M. Nielsen, Evergreen, Ala., assignors to Knud Nielsen Company, Inc., Evergreen, Ala., a corporation of Alabama
Filed May 10, 1967, Ser. No. 637,396
Int. Cl. A47g 33/08; B29h 7/20
U.S. Cl. 161—15                                       1 Claim

ABSTRACT OF THE DISCLOSURE

A composite artificial wreath form is comprised of a shaped reinforcing ring and foam polyurethane which is molded on and encases the annular ring. The process for making the wreath form includes suspending the annular ring on pins which are horizontally disposed in a vertically positioned mold, injecting a desired quantity of monomeric urethane into the mold, polymerizing the urethane so as to encase the wire reinforcing ring and curing the resulting wreath form for a period of time after removing the same from the mold.

CROSS REFERENCE TO RELATED APPLICATION

This application is related to an application having the Ser. No. 479,923, filed Aug. 16, 1965, now U.S. Pat. No. 3,438,839, and having the title "Artificial Topiary Forms and Method."

BACKGROUND OF THE INVENTION

Field of the invention

This invention relates to improvements in artificial wreath forms and, more particularly, to reinforced polyurethane wreath forms and to the method of producing the same. Devices of this type are sometimes classified under molding ring products in Class 249, subclass 57. Other pertinent classes and subclasses are Class 161, subclass 15; Class 249, subclass 117; and Class 249, subclass 187.

Description of the prior art

Although wreath forms have been made by florists for many years, the variety of materials and sizes thereof have been greatly limited by archaic production techniques. The first wreath forms were made by packing sphagnum moss into U-shaped wire frames and by wrapping the composite frames with waxed paper. Foliage, flowers and ribbons were attached to the wreath forms to finalize their appearance.

Approximately fifteen years ago, Styrofoam was developed by Dow Chemical Company of Midland, Mich. Because Styrofoam may be easily cut with a saw or hot wire into many shapes and designs, it soon became very popular for use as a wreath form. Wreath forms made of Styrofoam were not only less expensive than sphagnum moss wreath forms but were also much lighter in weight; therefore, the introduction of the Styrofoam wreaths drove the sphagnum moss forms from the market. One disadvantage of Styrofoam, however, is that it is basically brittle and the wreath forms cut therefrom easily crack if dropped or abused. Another disadvantage is that since the wreath forms are cut from a Styrofoam billet, reinforcing the same by means of a wire or the like is economically impractical. A third disadvantage is that the size of Styrofoam wreath forms is limited for the largest billets measure 24 inches by 9 inches by 8 inches, thereby making 24 inches the largest diameter wreath form which can be cut from Styrofoam.

Approximately eight years ago, a straw wreath form was introduced at a cost of approximately one-third that of the Styrofoam wreath. Straw wreath forms are made by preparing a roping of straw, rolling the rope into a ring, wrapping it with a cord or the like and, finally, wrapping the exterior with a plastic strip. Although this wreath form may be produced very inexpensively, it is difficult to insert picks and stems into the form for the picks and stems of the foliage engage the twistings of the rope and become deformed or broken. A further disadvantage of the straw wreath forms is the virtual impossibility of shaping a round wreath by the above-described method.

SUMMARY OF THE INVENTION

In this invention, a wire reinforcing ring is embedded in foamed polyurethane to form a composite wreath form. The wire ring may also include an integral eyelet which extends outwardly from the foamed polyurethane to receive a supporting nail or the like and the wire ring may also include a pair of integral support legs which, in combination with the eyelet, are equidistantly spaced around the periphery of the ring. The support legs are adapted to engage the ground and form two legs of a tripod support frame. A third leg of the tripod is added to the wreath form after the manufacture thereof and is pivotally connected to the eyelet at one of its ends. Also, the support legs and eyelets go to support the ring in the mold during the polymerization of the polyurethane. Alternatively, where the wire ring is not to have the support legs or eyelet, it is supported in the mold by providing a pair of support pins therein and by positioning the mold vertically so that the ring hangs from the support pins.

The polyurethane wreath as contemplated by this invention is molded by supporting a wire ring in a pair of mating half-shell cavity molds after which the molds are preheated to a temperature of approximately 110° F. The mold then receives a predetermined amount of monomeric urethane which, upon the polymerization thereof, will expand to fill the mold. The mold is maintained at a temperature ranging from 120° F. to 130° F. Immediately prior to the pouring of the urethane into the mold, a cross linking catalyst is added thereto in an amount sufficient to cause the urethane to polymerize in approximately ten to fifteen minutes. After the urethane has expanded to completely fill the cavity in the molds, the resulting wreath form which includes the reinforcing wire, is removed therefrom and allowed to cure at from 80° F. to 85° F. for approximately twenty-four hours. The wreath form may be cured at slightly higher temperatures for shorter periods of time. The twenty-four hour curing period allows the urethane to substantially complete its polymerization and gives the wreath form the proper working texture; otherwise, the foamed urethane has a tendency to collapse. The mold may be heated by any suitable means, such as steam, electricity or the like. It is also contemplated that the mold may be placed in a heated oven during the polymerization time or onto a conveyor which passes through an oven. The wreath form may be made in most any color by pigmenting the chemical blowing agent.

To complete the wreath form, foliage which may be natural or artificial, the artificial generally being made from polyethylene or the like, may be attached to the wreath forms by either inserting the stem of the foliage therein or by using greening or fern pins.

Therefore, an object of this invention is to provide an artificial wreath form which is light in weight and inexpensive to construct.

Another object of this invention is to provide artificial wreath forms which have been reinforced during the construction thereof to render the same less susceptible to breakage.

Yet another object of this invention is to provide artificial wreath forms which are uniform in construction.

A further object of this invention is to provide artificial wreath forms having handle and supporting means made integral therewith.

A still further object of this invention is to provide a method for manufacturing artificial, reinforced wreath forms in unlimited shapes and sizes.

Yet another object of this invention is to provide a method of embedding a reinforcing wire in foamed polyurethane by supporting the reinforcing wire on pin means which extend into a vertically positioned mold.

Other objects and advantages of this invention will become apparent when the following detailed description is read in conjunction with the appended specification, claim and drawings, in which:

DESCRIPTION OF THE DRAWINGS

FIG. 1 is a perspective view showing the reinforcing wire residing in an open mold which is about to receive the urethane monomer for the polymerization of the same;

FIG. 2 is a front elevation view of the novel wreath form having portions thereof cut away to show the reinforcing wire which is shaped to form leg portions and a pivot;

FIG. 3 is a side elevation view of FIG. 2;

FIG. 4 is a sectional view taken along lines 4—4 of FIG. 2;

FIG. 5 is a front elevation view of an alternate embodiment of the invention employing a conventional wreath support stand and showing the rod supports having been severed along the periphery of the polyurethane form;

FIG. 6 is a side elevation view of FIG. 5;

FIG. 7 is a sectional view taken along lines 7—7 of FIG. 5;

FIG. 8 is a block diagram showing the various steps used to carry out the method of constructing the artificial reinforced polyurethane wreath forms of this invention;

DETAILED DESCRIPTION OF THE PREFERRED EMBODIMENTS

Figure 9:
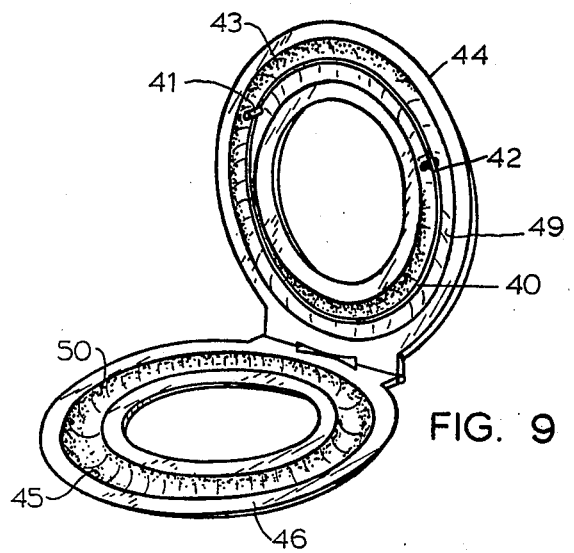
FIG. 9 is a perspective view showing the reinforcing wire ring being supported by two metal pins in a vertically positioned open mold.

In the first embodiment, a reinforcing wire ring 10 has been shaped so that there are leg extensions 11 and 12 and a hook or eyelet extension 13. A mold 14 is comprised of a bottom section 15 and a top section 16 which are pivotally secured to each other by means of hinges 17. Bottom section 15 and top section 16 include matching cavities 18 and 19, respectively, which are adapted to shape the polymerized urethane into a ring-like form. The diameter of the ring cavity depends upon the desired width of the product. Bottom section 15 of mold 14 has an injection hole 20 through which the mixed chemicals are forced into the mold. Bottom section 15 is also provided with grooves 23, 24 and 25 which are adapted to receive leg extensions 11 and 12 and eyelet 13, respectively. Likewise, top mold 16 is provided with grooves 27, 28 and 29 which, when closed over bottom mold 15, enclose legs 11, 12 and eyelet 13, respectively, and prevent the polyurethane from leaking out of the mold during the expansion thereof.

In operation, reinforcing wire ring 10 is placed on top of bottom section 15 so that the leg and eyelet extensions 11, 12 and 13 reside within grooves 23, 24 and 25, respectively. These grooves also serve as an aligning means for the wire ring 10 in mold 14. Once reinforcing wire ring 10 is in place, the top section 16 of the mold is pivoted into working relation with the bottom section 15 and is locked therewith. The mold is then heated to approximately 110° F. whereupon the mixed chemicals which include the monomeric urethane, blowing agents and catalysts are injected into the mold. The mold temperature is maintained at 120° F. to 130° F. for a period of ten to fifteen minutes by allowing the mold to pass through a heated tunnel on a conveyor. Having held the mold at the desired temperature for the required period of time, the foam is sufficiently set to extract the form 9 from the mold. Form 9 is then cured at 80° F. to 85° F. for twenty-four hours by leaving the same in a heated room. Foliage may then be added to the form.

A second embodiment, as shown in FIGS. 5, 6 and 7, provides reinforcing wire ring 33 with short appendages 30 and 31 which are adapted to reside in grooves 23 and 24 of bottom section 15 and in grooves 27 and 28 of top section 16, respectively, and in combination with eyelet 34 support ring 10 in mold 14. Upon the molding of the urethane on ring 10, the portions of appendages 30 and 31 which extend beyond the peripheral surface of molded form 20 are removed by cutting or the like. The composite wreath form 35 is thus adapted to be received by a tripod stand 36 or the like by inserting a suitable hook 37 through eyelet 34.

Figure 10:
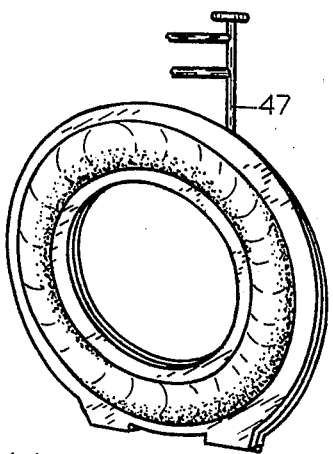
FIG. 10 is a perspective view showing the mold in a closed position and receiving the liquid urethane.
Figure 11:
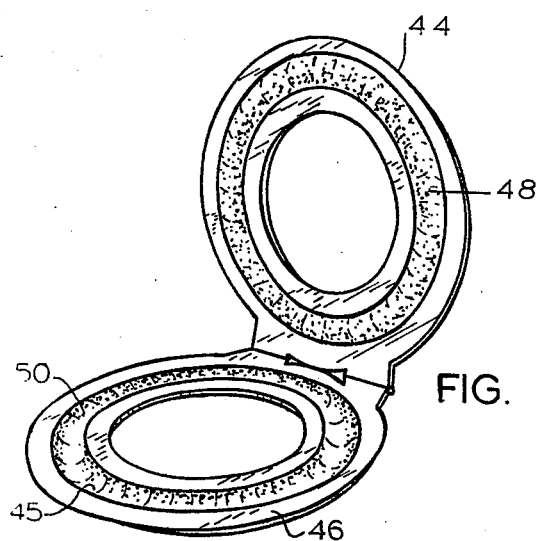
FIG. 11 is a perspective view showing the reinforced polyurethane wreath form having been molded and adapted to be removed from the mold cavity.

A third embodiment, as shown in FIGS. 9, 10 and 11, provides reinforcing wire ring 40 which is adapted to be suspended on pins 41 and 42. Pins 41 and 42 are cantilevered from cavity forming wall 49 and project horizontally into cavity 43 of upper cavity mold 44. Upper cavity mold 44 is maintained in a vertical position so as to allow wire ring 40 to be suspended from pins 41 and 42 and to be positioned substantially equidistant between its cavity forming wall 49 and cavity forming wall 50 of lower cavity mold 46 when lower cavity mold 46 is moved upwardly into a vertical position and in contact with upper cavity mold 44. Upon the securing of lower cavity mold 46 to upper cavity mold 44, the monomeric urethane, blowing agents and catalysts are injected into the composite mold through pipes 47 whereupon the foaming process as outlined above is carried out. The polyurethane form 48 is removed from upper cavity mold 44 by sliding the same off of pins 41 and 42.

It has been found that to provide for an easy removal of the urethane forms from the mold and to provide a smooth and textured form surface, the mold is first coated with a composition comprised of a polytetrafluoroethylene which may be purchased under the trademark "Teflon" manufactured by E. I. du Pont de Nemours, Inc. of Wilmington, Del. To further aid in the removal of the polyurethane forms from the mold, the cavity forming walls of the mold prior to receiving the monomeric urethane are coated with a paste wax. By providing the cavity forming walls with a coating of polytetrafluoroethylene and wax, the urethane forms do not have a tendency to stick to the walls thereby substantially reducing the number of rejects which occur during the manufacture of any given number of wreath forms molded.

Many different embodiments and sizes of this invention may be made without departing from the scope and spirit thereof. Therefore, it is to be understood that the invention is not to be limited to the specific embodiments shown and described herein, except as defined in the appended claim.

What is claimed is:

1. A composite artificial wreath form and stand adaptable to be placed upright on a supporting surface and to receive artificial and natural foliage comprising a shaped wire reinforcing ring having an annular portion and lengths being integral with and extending outwardly from said annular portion, said lengths forming a pair of spaced-apart surface engaging legs and an eyelet, said eyelet being spaced diametrically across and in the peripheral direction, equidistantly from said legs; foamed polyurethane having been molded on said annular portion of said shaped wire reinforcing ring and completely encasing said annular portion and portions of said legs and eyelet, said foamed polyurethane forming a solid body and having an easily penetratable surface for receiving said natural and artificial foliage; and an elongated support leg pivotally connected at one end to said eyelet and normally engaging said surface at the other, said support leg and said pair of spaced-apart legs being adapted to form a tripod supporting structure.

References Cited

UNITED STATES PATENTS

| | | | |
|---|---|---|---|
| 2,323,090 | 6/1943 | Ireland | 161—31 XR |
| 2,850,826 | 9/1958 | Testa | 47—41.12 |
| 3,236,007 | 2/1966 | Abeson | 161—165 XR |

JOHN T. GOOLKASIAN, Primary Examiner

H. F. EPSTEIN, Assistant Examiner

U.S. Cl. X.R.

161—31, 190; 248—27.8; 249—83; 264—45